US012562908B2

(12) United States Patent
Pajek et al.

(10) Patent No.: US 12,562,908 B2
(45) Date of Patent: Feb. 24, 2026

(54) REQUEST PROCESSING SYSTEM

(71) Applicant: FREEBIT CO., LTD., Tokyo (JP)

(72) Inventors: Jakub Pajek, Tokyo (JP); Atsuki Ishida, Tokyo (JP)

(73) Assignee: Freebit Co., Ltd., Tokyo (JP)

( * ) Notice: Subject to any disclaimer, the term of this patent is extended or adjusted under 35 U.S.C. 154(b) by 289 days.

(21) Appl. No.: 18/269,565

(22) PCT Filed: Nov. 30, 2021

(86) PCT No.: PCT/JP2021/043785
§ 371 (c)(1),
(2) Date: Sep. 11, 2023

(87) PCT Pub. No.: WO2022/138011
PCT Pub. Date: Jun. 30, 2022

(65) Prior Publication Data
US 2025/0279889 A1      Sep. 4, 2025

(30) Foreign Application Priority Data
Dec. 25, 2020      (JP) ................................ 2020-215949

(51) Int. Cl.
*H04L 29/06*          (2006.01)
*G07C 9/00*           (2020.01)
(Continued)

(52) U.S. Cl.
CPC .......... *H04L 9/321* (2013.01); *G07C 9/00182* (2013.01); *G07C 9/00857* (2013.01);
(Continued)

(58) Field of Classification Search
CPC ......... H04L 9/321; H04L 9/50; H04L 9/0819; G07C 9/00182
See application file for complete search history.

(56) References Cited

U.S. PATENT DOCUMENTS

2014/0079217 A1 *   3/2014   Bai ....................... H04L 9/3271
                                                              380/270
2014/0316992 A1 *  10/2014   Povolny ................. G07B 15/00
                                                              705/71
(Continued)

FOREIGN PATENT DOCUMENTS

CN          106850540 A      6/2017
CN          110599653 A     12/2019
(Continued)

OTHER PUBLICATIONS

Extended European search report for EP21910163.1 (PCT/JP2021043785).
International search Report of PCT/JP2021043785.

*Primary Examiner* — Evans Desrosiers
(74) *Attorney, Agent, or Firm* — Thorpe North & Western, LLP.; David W. Osborne

(57)          ABSTRACT

There is provided a request processing system for receiving a request sent from the first apparatus at the second apparatus and executing the request, wherein the first apparatus comprises: means for writing the generated first apparatus-identifying specific data into a predetermined address on a communication network; and means for sending a request with a signature, signed with the secret key, and the public key to the second apparatus, wherein the second apparatus comprises: means for reading the first apparatus-identifying specific data; means for authenticating the first apparatus by generating, from the public key, public key data enable to uniquely identify the public key; and determining whether this public key is included in the downloaded first apparatus-identifying specific data as well as, based on the determination, validating a signature of the request with a signature based on the public key received from the first apparatus and the unlocking cryptographic data included in the downloaded first apparatus-identifying specific data; and means
(Continued)

Blockchain
Smart contract
User terminal-specific identification code — 7
4
6
Smart key management server
B
User terminal-specific identification code
A
User terminal-specific identification code
3
Vehicle
Vehicle onboard apparatus
5
Request with a signature + Public key
C
User terminal
Smart key app
19  2
1 for executing the validated request based on the authentication of the first apparatus.

16 Claims, 11 Drawing Sheets

(51) Int. Cl.
    *H04L 9/00*          (2022.01)
    *H04L 9/08*          (2006.01)
    *H04L 9/32*          (2006.01)

(52) U.S. Cl.
    CPC .......... *H04L 9/0819* (2013.01); *H04L 9/0866* (2013.01); *H04L 9/50* (2022.05)

(56) References Cited

U.S. PATENT DOCUMENTS

| | | | | |
|---|---|---|---|---|
| 2018/0375667 | A1* | 12/2018 | Sovio ...................... | H04L 9/321 |
| 2023/0077053 | A1* | 3/2023 | Topps ................... | H04L 9/0825 |

FOREIGN PATENT DOCUMENTS

| | | | |
|---|---|---|---|
| CN | 111028398 | A | 4/2020 |
| DE | 102018002466 | A1 | 9/2019 |
| JP | 2006009333 | A | 1/2006 |
| JP | 2006-262184 | A | 9/2006 |
| JP | 2009275363 | A | 11/2009 |
| JP | 2018-093434 | A | 6/2018 |
| JP | 6340107 | B1 | 6/2018 |
| WO | 2020/050390 | A1 | 3/2020 |
| WO | 2020/189926 | A1 | 9/2020 |

* cited by examiner

6 Smart key management server

Vehicle/vehicle onboard apparatus management section    53

Smart contract issuing section    54

Smart contract address storage section    55

User ID receiving section    56

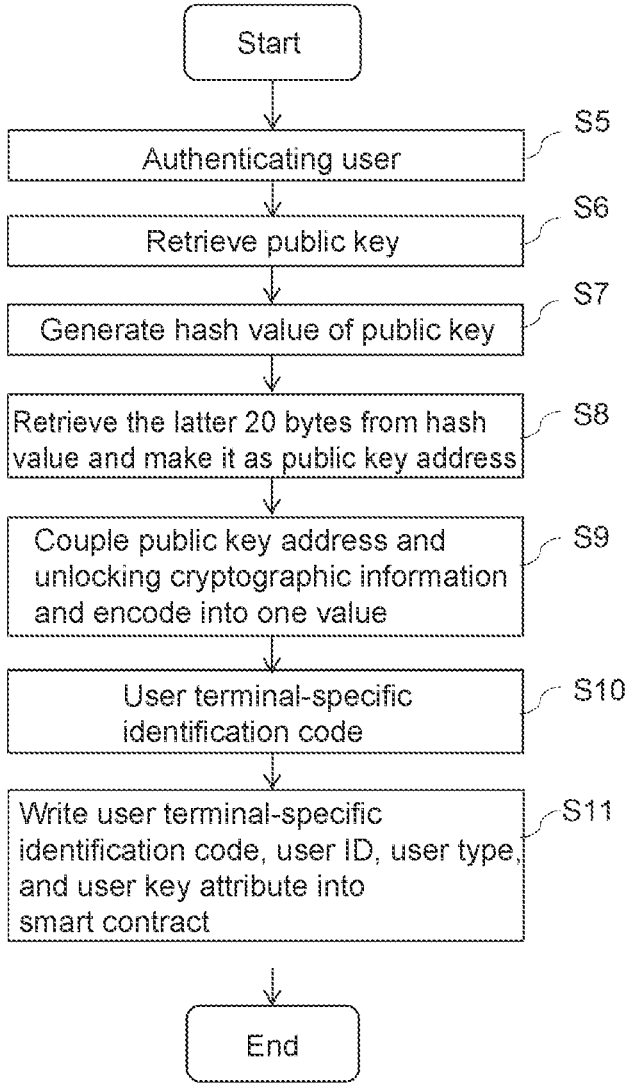

Writing user terminal-specific
identification code in smart contract

Start

Authenticating user                                    S5

Retrieve public key                                    S6

Generate hash value of public key                      S7

Retrieve the latter 20 bytes from hash
value and make it as public key address                S8

Couple public key address and
unlocking cryptographic information                    S9
and encode into one value User terminal-specific
identification code                                    S10

Write user terminal-specific
identification code, user ID, user type,               S11
and user key attribute into
smart contract End

Steps of request transmission processing from user terminal to vehicle onboard apparatus

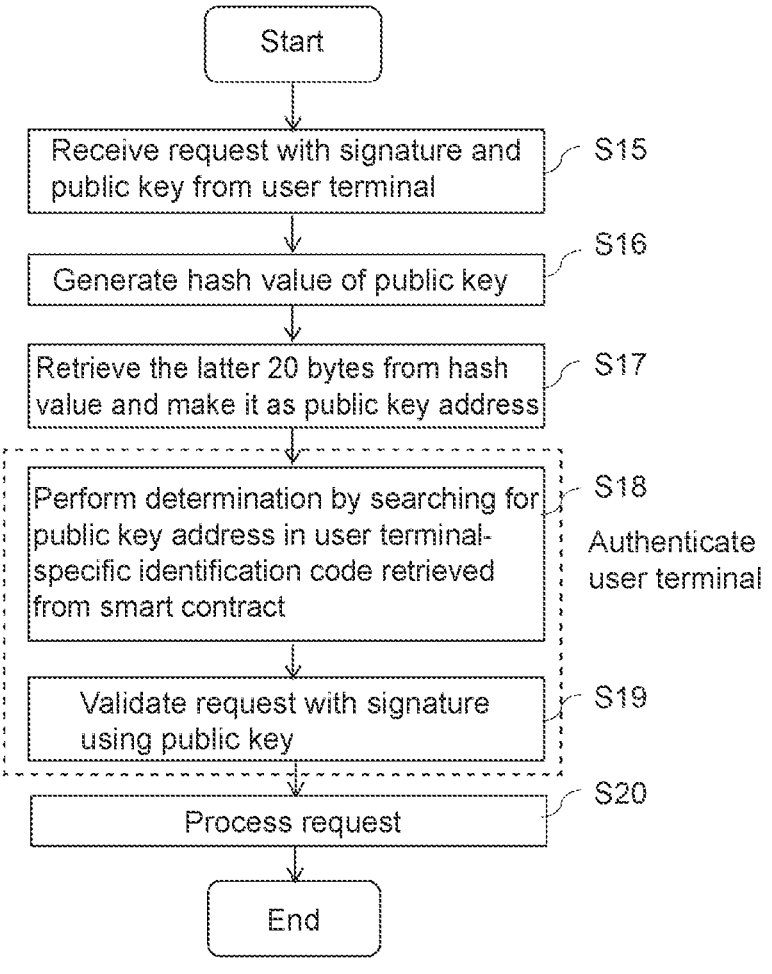

Steps of request processing
at vehicle onboard apparatus

Start

Receive request with signature and
public key from user terminal    S15

Generate hash value of public key    S16

Retrieve the latter 20 bytes from hash
value and make it as public key address    S17

Perform determination by searching for
public key address in user terminal-
specific identification code retrieved
from smart contract    S18

Authenticate
user terminal

Validate request with signature
using public key    S19

Process request    S20

End

FIG. 11

REQUEST PROCESSING SYSTEM

FIELD OF THE INVENTION

The present invention is related to a request processing system and a method thereof for processing a request to lock or unlock a vehicle, house, locker, or the like using an electronic device such as a smart key.

BACKGROUND OF THE INVENTION

Practical applications have been developed for a smart key system for locking or unlocking a vehicle, a locker, or the like without using a physical key, and the following literatures are listed as prior art.

Prior Art Document

Patent Document

Patent Document 1
Japanese Unexamined Patent Application Publication No. 2006-9333
Patent Document 2
Japanese Unexamined Patent Application Publication No. 2009-275363

Non-Patent Document

SUMMARY OF THE INVENTION

Problem to be Solved by the Invention

Here, according to certain statistics, an average number of years of use of an automobile in Japan as of 2017 was 12.91 years. Meanwhile, as for smart keys for locking and unlocking vehicles, certain private corporations manage their respective systems in general, and there is no guarantee that those corporations can continuously provide their managing services over the entire years of automobile use. Also, excessively high managing expenses of the smart keys makes it difficult to continue those services due to overbearing burden.

Considering the above situation, the purpose of the present invention is to provide a system capable of providing a service more universally without relying on a particular service provider in a request processing apparatus such as ones processed between a smart key and a vehicle onboard apparatus.

Means for Solving the Problem

In order to achieve the above object, the present inventors considered—in utilizing a technology for authenticating a first apparatus and a second apparatus using a public key—that storing an actual public key in a server will overload the server's storage area, devised an apparatus capable of accurate authentication without sharing the public key on a network, and validated that concept in good faith to finally complete the present invention.

In other words, according to a principal aspect of the present invention, the following invention is provided.

A request processing system, comprising:
(1) a first apparatus and a second apparatus associated with the first apparatus, the request processing system being for receiving a request sent from the first apparatus at the second apparatus and executing the request,
wherein the first apparatus comprises:
means for maintaining a specific secret key and a public key;
means for generating first apparatus-identifying specific data, including public key data enable to uniquely identify the public key and smaller in size than the public key, and unlocking cryptographic data enable to uniquely identify unlocking cryptographic information;
means for writing the generated first apparatus-identifying specific data into a predetermined address on a communication network; and
means for sending a request with a signature, signed with the secret key, and the public key to the second apparatus,
wherein the second apparatus comprises:
means for reading the first apparatus-identifying specific data written at the predetermined address;
means for authenticating the first apparatus by generating, from the public key received from the first apparatus, public key data enable to uniquely identify the public key; and determining whether this public key is included in the downloaded first apparatus-identifying specific data as well as, based on the determination, validating a signature of the request with a signature based on the public key received from the first apparatus and the unlocking cryptographic data included in the downloaded first apparatus-identifying specific data; and
means for executing the validated request based on the authentication of the first apparatus.

According to such a configuration, when a request is sent from the first apparatus to the second apparatus, the public key is sent to the second apparatus together with this request. Further, at this second apparatus the above public key may be uniquely identified; the smaller-sized public key is generated for comparison with the specific data retrieved from the predetermined address on the network; and a particular unlocking data is used to validate the signature added to the request to thereby authenticate the user terminal.

In this manner, since the actual public key may be directly sent from the first apparatus to the second apparatus, the shared information does not need to be the public key itself, and the "public key data," which is smaller in size than the public key, may be placed at a predetermined address on the network. Thus, an effect may be achieved in that a server storage area for managing the smart key and the like are not overloaded.

Here, according to one embodiment of the present invention, it is preferred that the first apparatus is a smart key, and that the second apparatus is mounted on a vehicle and is a vehicle onboard apparatus for controlling unlocking and locking of the vehicle by the request of the first apparatus.

Also, according to another embodiment of the present invention, the public key data is preferably generated by using a hash function to convert the public key; and more preferably, the last 20 bytes extracted of this hash value as well as a public key address used in a blockchain system.

According to yet another embodiment of the present invention, the first apparatus-identifying specific data is preferably written in a smart contract address of Ethereum. Thus, storing the user terminal-specific identification code on a blockchain network ensures the universality of code storage.

According to still another embodiment of the present invention, this system preferably sends the first apparatus-identifying information to the predetermined address in order to authenticate the writing authority by the first apparatus.

The above and other characteristics of the present invention will be readily appreciated by those skilled in the art by referring to the following Detailed Description of the Invention and the accompanying drawings.

Effect of the Invention

BRIEF DESCRIPTION OF THE DRAWINGS

FIG. 7 is a flowchart showing the steps of issuing a user terminal-specific identification code according to the one embodiment;

FIG. 11 is a flowchart showing the steps of processing a request according to the one embodiment.

DETAILED DESCRIPTION OF THE INVENTION

One embodiment of the present invention will be described below in accordance with accompanying drawings.

Figure 1:
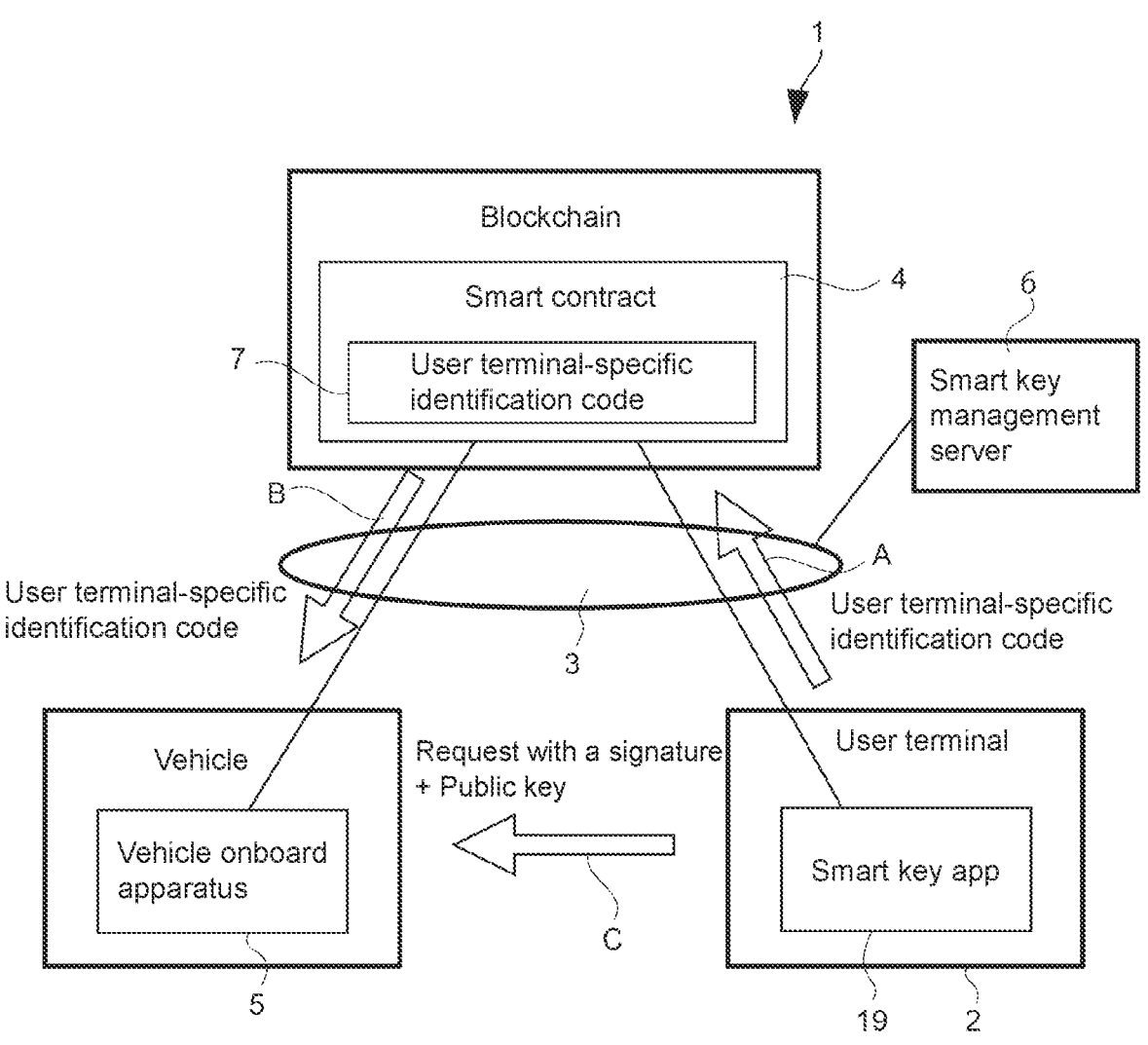
FIG. 1 is an overall configuration diagram showing a system according to one embodiment of the present invention.

FIG. 1 is an overall configuration diagram showing an example of applying a request processing system of the present invention to a smart key system 1 for performing locking and unlocking of a vehicle door.

Overall Configuration

This smart key system 1 comprises one or multiple user terminals 2 (corresponding to a "first apparatus" of the present invention); a smart contract 4 (a "predetermined address on a network" of the present invention) connected with this user terminal 2 via the Internet 3 (corresponding to the "network" of the present invention); a vehicle onboard apparatus 5 (corresponding to a "second apparatus" of the present invention) mounted on a vehicle; and a smart key management server 6 for managing this smart key system 1.

In this smart key system 1, the user terminal 2 writes, in the smart contract 4 in advance, a user terminal-specific identification code (specific data for identifying the first apparatus) 7 (A). On the other hand, the vehicle onboard apparatus 5 retrieves the user terminal-specific identification code 7 from the smart contract 4 (B) and stores it in the user terminal 2. Then, if a user of the vehicle uses the user's own user terminal 2 to send a particular request to the vehicle onboard apparatus 5 (C), the vehicle onboard apparatus 5 is configure to use the user terminal-specific identification code 7 to perform qualification authentication of the user terminal 2.

Smart Contract

Here, the smart contract 4 is a computer protocol built on the Ethereum, and is configured such that a transaction is automatically performed if a contract and its execution condition are programmed in advance and if that contract condition is met.

In Ethereum, it is configured so that an execution history of a smart contract 4 is recorded in a blockchain on a P2P network called Ethereum network. Ethereum has a tunable programming language for describing a smart contract 4, and a network participant is enabled to describe and execute an arbitrary smart contract 4 in a blockchain on this network. Such a mechanism has enabled executing a program and sharing its result with the entire P2P as an execution environment without depending on a particular central managing organization.

User Terminal

The user terminal 2 is typically a smartphone, but it may be a tablet or any other computer device.

Also, in this embodiment, there are configured three types of users using this user terminal 2: an owner possessing a vehicle, the owner's family, and a car-sharing user. For example, in a car-sharing service, an operator of a car-sharing business is an owner, whereas a person sharing a vehicle is a car-sharing user merely utilizing a vehicle. Similarly for a rent-a-car, an operator of a rent-a-car business is an owner possessing vehicles, and a person who rents a vehicle is a car-sharing user utilizing the vehicle. Also, in case of a private car, a registered owner of the car is an owner, and the owner's family member driving the car is a user utilizing the vehicle.

In this embodiment, as discussed in detail below, there are different authorities for writing into a smart contract 4 according to the user type.

(Vehicle Onboard Apparatus)

The vehicle onboard apparatus 5 is an electronic apparatus mounted on a vehicle, and equipped with a function for controlling locking and unlocking of a door of the vehicle. In addition to the above function, this vehicle onboard apparatus 5 may be equipped with other functions, for example, a highway toll payment function, a navigation audio visual function, and the like.

In this embodiment, each vehicle onboard apparatus 5 is assigned with a specific address (smart contract address) of the smart contract 4, and the user terminal 2 writes the above user terminal-specific identification code 7 in this smart contract address (indicated with A in FIG. 1). Then, the vehicle onboard apparatus 5 retrieves and stores the written user terminal-specific identification code 7 (indicated with B in FIG. 1). Subsequently, upon receiving a request with a signature, and a public key from the user terminal 2 (indicated with C in FIG. 1), the vehicle onboard apparatus 5 compares the above user terminal-specific identification code 7 and the public key, and also validates the signature of the request with a signature (for unlocking or locking) to thereby authenticate the user terminal 2, and then, process the request as needed.

Smart Key Management Server

Also, the smart key management server 6 is, for example, operated by the present applicant, and it has a function for generating a smart contract 4 on a blockchain for each vehicle onboard apparatus as well as a function for setting an address of the smart contract in the user terminal 2 and the vehicle onboard apparatus 5.

Configuration of each of the devices 2-6 will be described in detail below.

Detail Configuration of User Terminal

Figure 2:
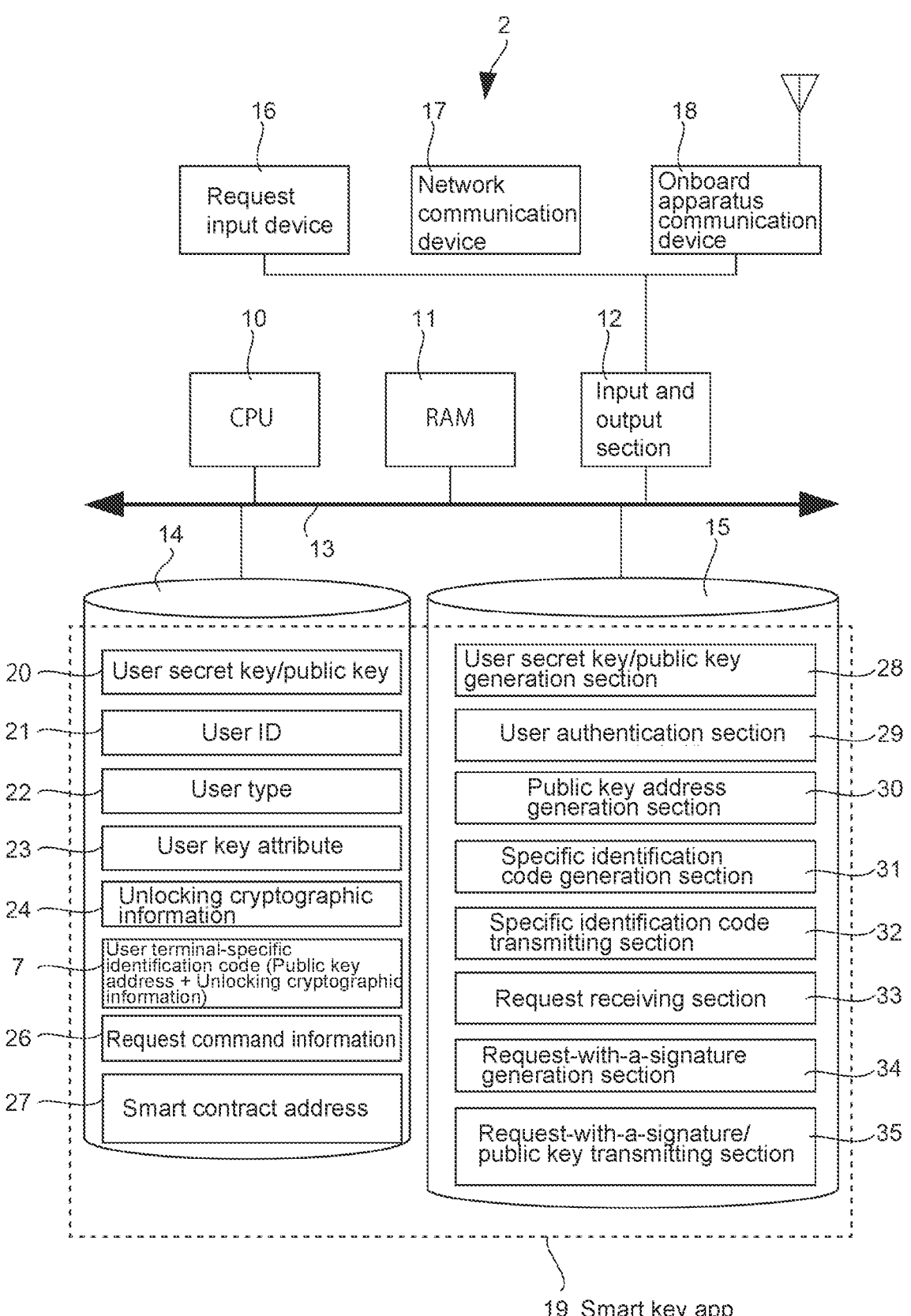
FIG. 2 is a system configuration diagram showing a smart key according to the one embodiment.

FIG. 2 is a schematic structural view showing the user terminal 2.

The user terminal 2 is defined by a CPU 10, a RAM 11, and an input/output section 12, which are connected with a bus 13, which is in turn connected with a data storage section 14 and a program storage section 15. In this embodiment, connected to the input/output section 12 are a request input device 16 such as a button, a keyboard, a touchscreen, and/or the like for entering a request to the vehicle onboard apparatus 5; a network communication device 17 for communicating the network 3; and a onboard apparatus wireless communication device 18.

Data Storage Section

The data storage section 14 stores therein—to only list data related to the present invention—user secret key/public key 20; a user ID 21 (Ethereum address in this embodiment); a user type 22 (owner, family, or share); a user key attribute 23 (key expiration date, etc.); unlocking cryptographic information 24; the user terminal-specific identification code 7; request command information 26 (unlocking, locking, etc.); and a smart contract address 27 (Ethereum address).

Program Storage Section

Also, the program storage section 15 stores therein—to only list configurations related to the present invention—a user secret key/public key generation section 28; a user authentication section 29; a public key address generation section 30; a user terminal-specific identification code generation section 31; a specific identification code transmitting section 32; a request receiving section 33; a request-with-a-signature generation section 34; and a request-with-a-signature/public key transmitting section 35.

Note that the data storage section 14 and the program storage section 15 are namely auxiliary storage devices (HDD and/or SDD) of this user terminal 2. Also, the respective functional sections 29-35 stored in the above program storage section 15 are configured as a "smart key app 19," in which the respective functional sections 29-35 are partially or fully installed in the user terminal 2 (see FIG. 1). Moreover, when this app 19 is installed, space is secured for storing the respective information 20-27 of the data storage section 14 in the auxiliary storage device of the user terminal 2.

Note that the respective information 20-27 of this data storage section 14 may be respective tables of a database and their values stored therein, or may be directly written as in programs in the respective functional sections 29-35 stored in the program storage section 15. Also, since the user's secret key needs to be managed in the safest-possible way, the user secret key is preferably stored in a secure element provided by the user terminal (smartphone, etc.).

Further, the respective functional sections 29-35 stored in the program storage section 15 are adapted to be called, deployed, and executed as needed on the RAM 11 by the CPU 10 to thereby function as respective components described in the claims of the present application.

Vehicle Onboard Apparatus

Figure 3:
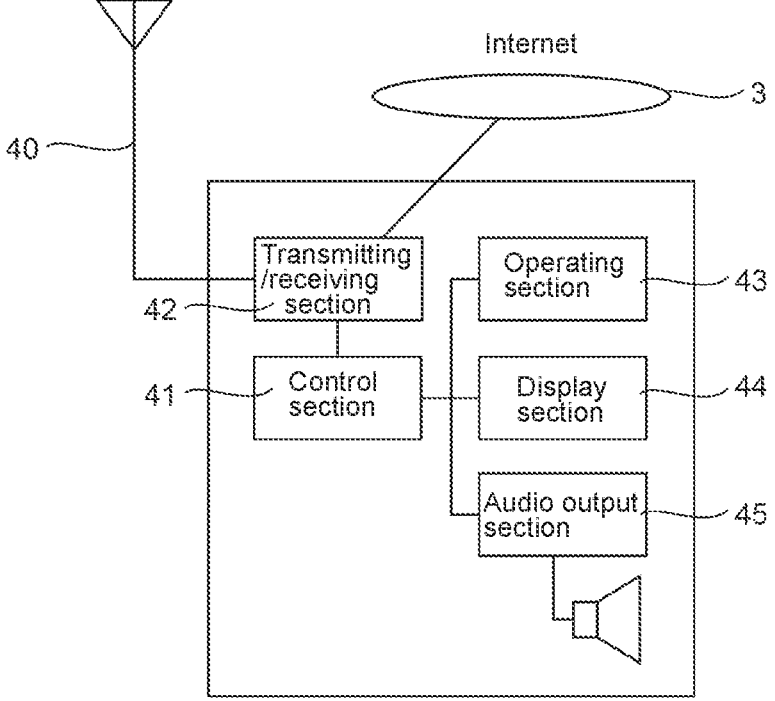
FIG. 3 is a schematic structural view showing a vehicle onboard apparatus according to the one embodiment.

FIG. 3 is a schematic structural view showing the vehicle onboard apparatus 5.

This vehicle onboard apparatus 5 has a control section 41, a transmitting/receiving section 42 connected with this control section 41, a operating section 43, a display section 44, and an audio output section 45. The above transmitting section 42 is provided with an antenna 40 for directly and wirelessly communicating with the user terminal 2, and also adapted to be capable of connecting with the Internet 3 in order to communicate with the smart contract 4 and the smart key management server 6.

Figure 4:
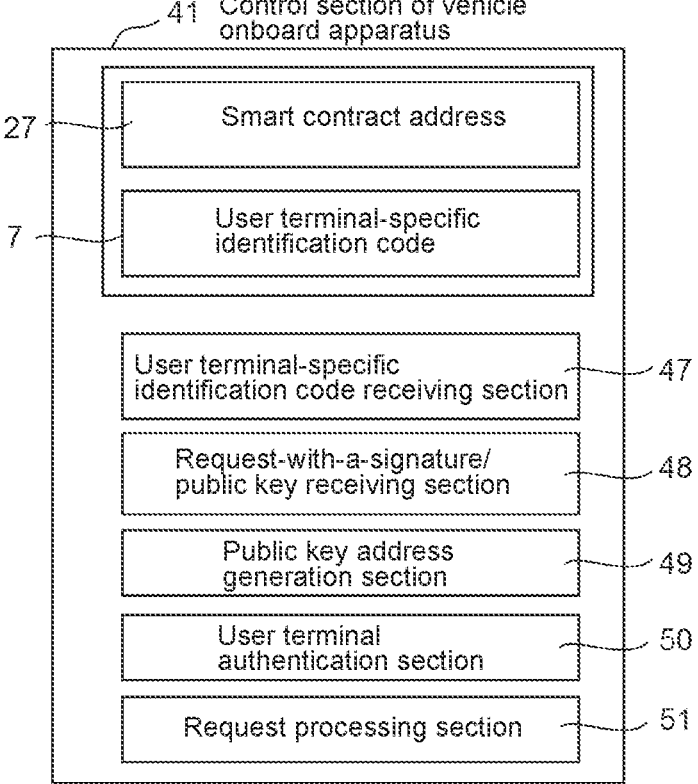
FIG. 4 is a schematic structural view showing a control section of the vehicle onboard apparatus according to the one embodiment.

FIG. 4 is a function block diagram showing a configuration implemented in the control section 41.

This control section 41 has a user terminal-specific identification code receiving section 47, a request-with-a-signature/public key receiving section 48, a public key address generation section 49, a user terminal authentication section 50, and a request processing section 51. Also, this control section 41 is adapted such that it may store the smart contract address 27 and the user terminal-specific identification code 7 in a memory.

Smart Key Management Server

Figure 5:
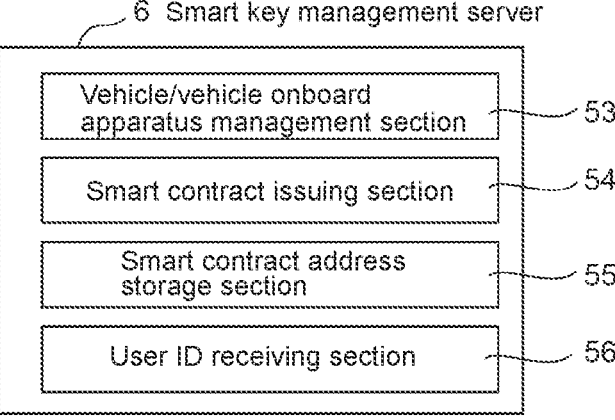
FIG. 5 is a system configuration diagram showing a smart key management server according to the one embodiment.

Further, FIG. 5 is a function block diagram showing the simplified smart key management server 6.

To only show configurations related to the present invention, this smart key management server 6 has a vehicle/vehicle onboard apparatus control section 53, a smart contract issuing section 54, a smart contract address storage section 55, and a user ID receiving section 56.

The above configuration will be discussed in detail below in reference with their respective operations.

Installation and Activation of Smart Key App

Firstly, when the above user terminal is a smartphone or the like, the system shown in FIG. 2 is configured by installing and activating the smart key app 19 described above. In this embodiment, during this installation and activation, a user ID is set to this smart key app 19, and based on this user ID, the user secret key/public key generation section 28 generates a user secret key/public key 20 and stores it in the data storage section 14.

Note that these user secret key and public key may be generated using an OS of the user terminal, or may be generated by another apparatus (for example, the smart key management server 6 or the like) for use.

Generation of Smart Contract

Figure 6:
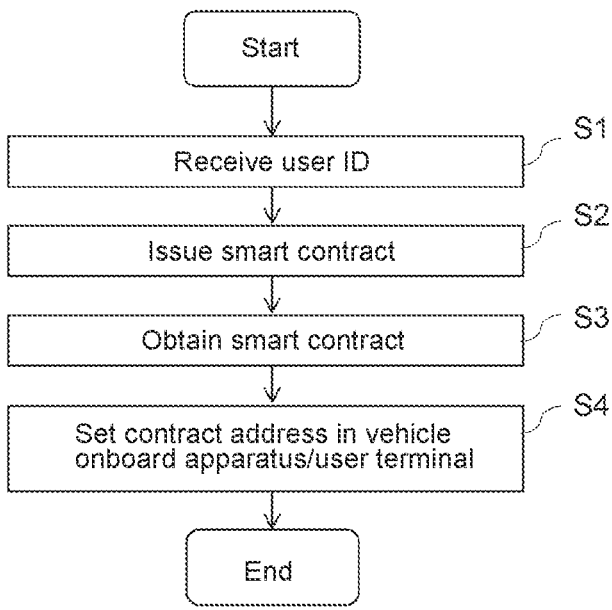
FIG. 6 is a flowchart showing the steps of setting a smart contract address according to the one embodiment.

FIG. 6 is a flowchart showing steps of issuing a smart contract at the smart key management server 6.

Firstly, the user ID receiving section 56 receives a user ID 21 from the user terminal 2 (Step S1).

Next, the smart contract issuing section 54 refers to information of a vehicle onboard apparatus stored in the vehicle/vehicle onboard apparatus management section 53, and issues a smart contract for each vehicle/vehicle onboard apparatus (Step S2). Here, the previously received user ID is specified as "user type: owner" via constructor parameters of the smart contract 4.

After the smart contract 4 is issued, the Ethereum network generates a smart contract address (Ethereum address) 27, which will be stored in the smart contract address storage section 55 in association with the vehicle/vehicle onboard apparatus (Step S3). This generated address will be a unique identifier of the smart contract.

Subsequently, this smart contract address 27 is registered in a smartphone app 19 (smart key) on the user terminal 2 of the vehicle owner, and a vehicle onboard apparatus 5 (Step S4) (see FIG. 2, FIG. 4). Specific registration method varies depending on the system, but it may be done online or installed offline.

Thus, the vehicle onboard apparatus 5 and the user terminal 2 will share the same smart contract address 27, and therefore, it will be possible to write data in a particular smart contract 4, refer to the user ID 21, and with authority, write data into the smart contract 4.

Note that, in this embodiment, each individual user has an Ethereum address and uses it as the user ID.

User Authentication at User Terminal

FIG. 7 is a flowchart showing operations on the user terminal 2.

Firstly, the user authentication section 29 performs user authentication on this user terminal 2 (Step S5).

In this embodiment, user authentication utilizes a password and/or biometrics authentication executed by the OS of this terminal 2. Note that it may be configured such that the user has a member account in the smart key management server 6, wherein a predetermined ID and a password may be used to log into the member account.

Figure 8:
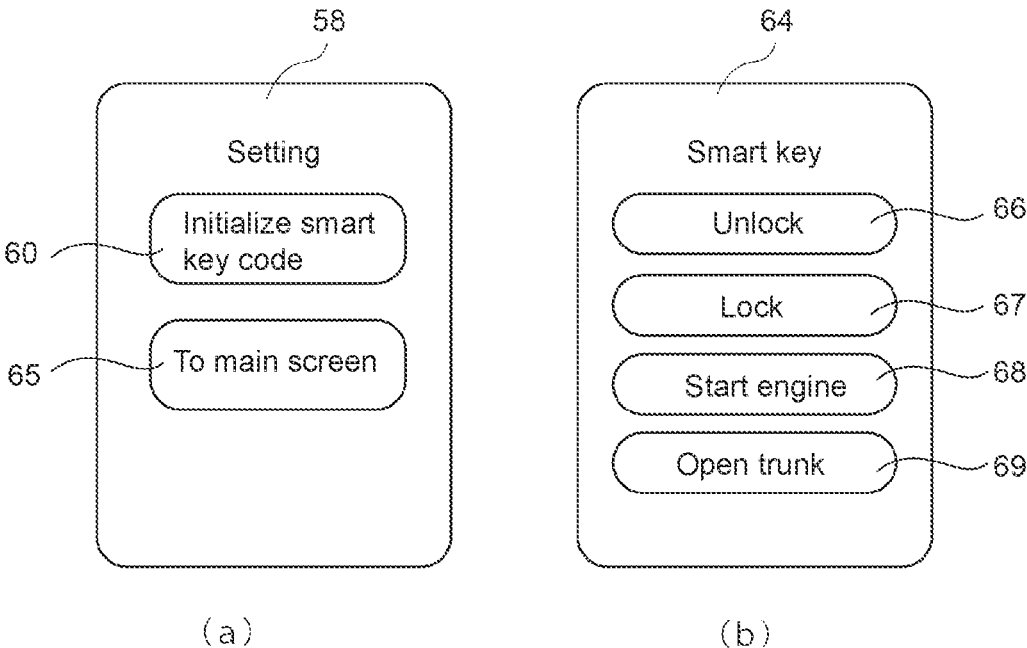
FIG. 8 is a schematic view showing a user interface of a smart key according to the one embodiment.

Upon successful authentication by this user authentication section 29, this smart key app 19 displays a user interface 58, as shown in FIG. 8 (*a*), on the user terminal 2.

Generation of Public Key Address by User Terminal

When the user presses a code initialization button (corresponding with the above-mentioned request input device), indicated with 60 in the figure, on the user interface 58, the public key address generation section 30 and the specific identification code generation section 31 refers to the user secret key/public key 20 to generate a public key address sized smaller than the number of bytes of the public key, and utilizes this public key address to generate the user terminal-specific identification code 7 (Steps S6-S10).

These operations of the public key address generation section 30 and the specific identification code generation section 31 will be described below in an example where a public key cryptographic algorithm is the ECDSA.

Firstly, the public key address generation section 30 retrieves the public key (Step S6). An ECDSA public key is 65-byte long.

Next, the public key address generation section 30 hashes the ECDSA public key using a hash function (Keccak-256) to generate a 256-bit (32-byte) hush value (Step S7). Then, it extracts the latter 20 bytes from the 32-byte hash value as a "public key address" (Step S8).

In this embodiment, one reason for changing the public key address data size down to 20 byte is because that has been validated to be one of the minimum sizes in order to identify the public key uniquely enough. Therefore, as long as this purpose is attainable, the public key address may even have a smaller number of bytes than 20, and of course, a greater number of bytes than 20.

Generation of Identification Specific Code by User Terminal

When the public key address is generated as above, the user terminal-specific identification code generation section 31 couples this public key address with unlocking cryptographic information 24 (a unique identifier of a signature scheme and a parameter of a signature scheme) and stores it as a user terminal-specific identification code 7, which is one value (Steps S9, S10).

Figure 9:
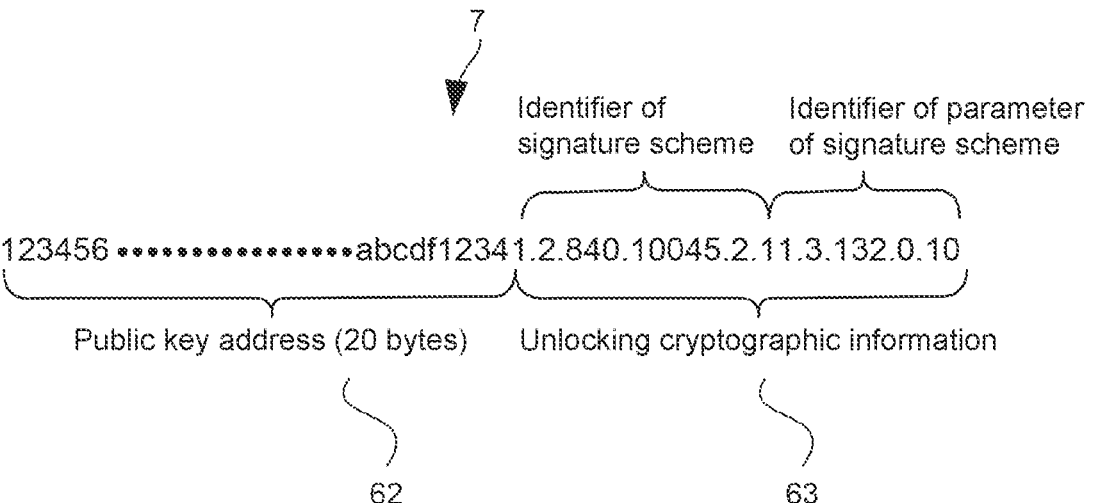
FIG. 9 is a explanatory view describing a structure of the user terminal-specific identification code according to the one embodiment.

Specifically, as shown in FIG. 9, public key address 62 (20 bytes) is coupled with the unlocking information (a unique identifier of a signature scheme and a unique identifier of a parameter of a signature scheme) (for ECC, "1.2.840.10045.2.1" and "1.3.132.0.10," respectively) into one value, which will be binary-encoded to generate an individual identification code value to be stored. As a specific data format, in this embodiment, the SubjectPublicKeyInfo (SPKI) format of ASN.1 DER-encoded X.509 is used.

In such a configuration as the above, the smaller the size of an actual public key is, the smaller the size of the entire SPKI-specific identification code 7 also becomes, allowing to reduce a storage area in the smart contract, for example, from 3 slots to 2 slots (the present embodiment).

Note that, typically, in the public key data, there is no unlocking cryptographic information (public key cryptographic method and parameters). Therefore, only sharing the public key is meaningless; one would not know how to use the public key unless its context or cryptographic information is also known.

Note that, when sharing the public key of an Ethereum user account, only the actual public key data may be shared; this is because public key cryptographic information (method: ECC, parameter: secp256k1) is fixed by context (Ethereum specifications).

Whereas, in the smart key system according to the embodiment of the present invention, a signing method for the request with a signature, discussed below, needs to accommodate a plurality of public key cryptography methods, and (or) the context does not limit the public key cryptographic information. When sharing a public key in such an environment, public key cryptographic information also needs to be shared.

Also, in theory, it is possible to share the public key address 62 and unlocking cryptographic information 63 separately. However, since that would be inconvenient, in this example, public key cryptographic information and actual public key data are generated and shared as one value (code) (see FIG. 9).

Writing Specific Identification Code by User Terminal

Next, the specific identification code transmitting section 32 refers to the smart contract address 27 and writes the specific identification code 7 generated as above in the smart contract 4 (Step S11).

Also, in this embodiment, the specific identification code transmitting section 32 writes the following information in addition to the above codes (Step S11).

User ID (in this embodiment, Ethereum address of the user is used as the user ID)

User type (owner, family, share, etc.)

User's key attribute (e.g., effective period of the key; vehicle speed limit when this key was used for unlocking, etc.; uniquely formatted binary data encoded with DER).

By writing the four values including the above additional values in the smart contract 4, specification on unlocking a vehicle will become possible by whom (user address), with what authority (user type), with which key (user's key), and during what period of time (user key attribute).

Note that, in this embodiment, one smart contract 4 is adapted to be capable of storing therein "user information" of one vehicle owner (type: owner) and "user information" of a plurality of users (type: family, share, etc.).

Also, only a user having a user ID of user type "owner" may write into a smart contract.

Note that, for the user authority authentication method, this embodiment is adapted to use a conventional authentication method of Ethereum.

Specifically, the authentication is executed with the following steps.

(a) The Ethereum network recovers a public key from a transaction signature and transaction data.

(b) The Ethereum network generates an Ethereum address (user ID) of a user from the recovered public key.

(c) The Ethereum network passes over the generated Ethereum address to a smart contract as a sender address of the transaction.

(d) Finally, on a vehicle smart contract side, the sender address of the transaction delivered to the smart contract is checked, wherein a writing transaction will be permitted if it matches the user ID (Ethereum address) of the user type: owner, and the transaction will not be permitted if it does not match.

Note that, in this embodiment, this code generation is done by the app 19 installed in the user terminal 2, but the external smart key management server 6 may perform the encoding, and it may even perform the writing into the smart contract 4 as described herein below.

Sending Request With Signature by User Terminal

Figure 10:
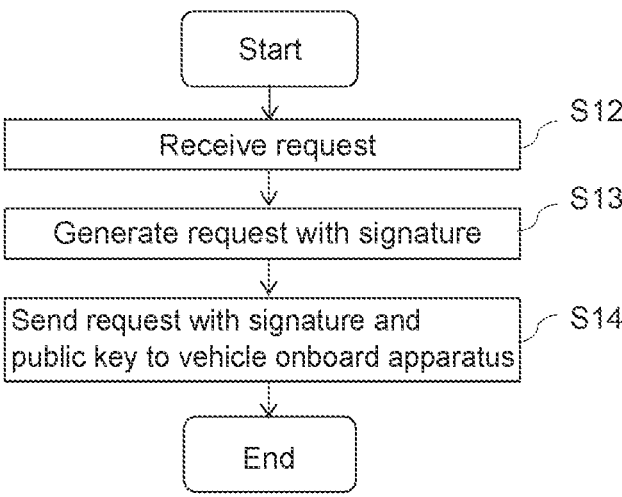
FIG. 10 is a flowchart showing the steps of sending a request according to the one embodiment.

Next, request transmission operations by the user terminal 2 will be described with respect to a flowchart shown in FIG. 10.

Firstly, after a specific identification code 7 is written in a smart contract through the interface of FIG. 8 (*a*), by pressing the main screen button 65, a request command input interface will be displayed, as indicated with 64 in FIG. 8 (*b*).

In this example, as input-permitted requests, unlock 66, lock 67, start engine 68, and open trunk 69 are displayed. However, the present invention is not so limited.

Subsequently, when the user presses any of the buttons, that request is received (Step S12), and request command information 26 corresponding with that button will be retrieved from the data storage section 14 followed by a request with a signature being generated by the request-with-a-signature generation section 34 (Step S13). Specifically, an electronic signature is created by using a secret key in user secret key/public key information to encode the request, and a request with a signature including that electronic signature is generated.

Next, the request-with-a-signature transmitting section 35 sends a request with a signature and a public key for utilizing a vehicle to the vehicle onboard apparatus 5 (Step S14). This request may include a vehicle usage condition (e.g., date/time of use) in addition to the request itself. The request with a signature and the public key are sent to the vehicle onboard apparatus 5 wirelessly via the wireless communication device.

Note that the transmission method is not limited to wireless communication and, for example, transmission may be performed via a network using a public wireless network.

Operation of Vehicle Onboard Apparatus

Next, operations of the vehicle onboard apparatus 5 will be described with respect to a flowchart of FIG. 11.

Firstly, as discussed above, it is presumed that the smart contract address 27 issued by the smart key management server 6 has been set in this vehicle onboard apparatus 5. This address is set offline or online in the vehicle onboard apparatus 5 as previously mentioned.

Retrieving Identification Code From Smart Contract at Vehicle Onboard Apparatus

Next, the user terminal-specific identification code receiving section 47 refers to the smart contract address 27 and retrieves the user terminal-specific identification code 7 from a smart contract according to the address 27 via the transmitting/receiving section 42.

Timing to download this specific identification code 7 is arbitrary, but for example, the specific identification code 7 may be requested on a regular basis or according to a predetermined schedule.

Receiving Request With a Signature From User Terminal at Vehicle Onboard Apparatus The request-with-a-signature receiving section 48 receives a request with a signature and a public key sent from the user terminal 2 through the transmitting/receiving section 42 (Step S15).

Generation of Public Key Address at Vehicle Onboard Apparatus

Subsequently, the public key address generation section 49 a generates a public key address from the public key received by the request-with-a-signature receiving section 48. This generation is executed in a similar method to the generation of the public key address 62 by the public key address generation section 30 of the user terminal as discussed above (Steps S16, S17).

Authentication of User Terminal at Vehicle Onboard Apparatus

Next, the user terminal authentication section 50 uses the public key address generated as above to authenticate the user terminal 2. This authentication process is performed through the next two steps (Steps S18, S19).

Firstly, the user terminal authentication section 50 searches for the public key address generated as above in the identification code 7 retrieved from the smart contract (FIG.

9), and if a matching code character string (public key address 62) exists, it is tentatively determined that the public key and the request with a signature have been sent from a predetermined user terminal 2 (Step S18).

However, this alone is not enough to authenticate the user terminal. It is because both of the smart contract content and the public key are public information.

Thus, the user terminal authentication section 50 validates the request with a signature using the public key (Step S19). If this validation yields a positive result, the request with a signature is authenticated to have been sent from a predetermined user terminal 2.

Next, the request processing section 51 receives the above authentication result to execute processing based on the validated request (Step S20).

For example, in case of vehicle onboarding, if an unlocking request is sent from the user terminal 2 to the vehicle onboard apparatus 5, it unlocks the vehicle in response. Similarly, if a request including locking is sent, the vehicle onboard apparatus 5 locks the vehicle in response.

According to the configuration discussed above, since the actual public key may be directly sent from the user terminal 2, which is the first apparatus, to the vehicle onboard apparatus 5, which is the second apparatus, the information shared on blockchain does not need to be the public key itself, and the "public key data," which is smaller in size than the public key, may be placed at a predetermined address on the network. Accordingly, an effect may be achieved in that a server storage area for managing the smart key and the like are not overloaded.

It should be mentioned that the present invention is not limited by the above embodiment, and that various changes and modifications can be made without departing from the scope and spirit of the present invention.

For example, the above embodiment example illustrated an electronic key system utilizing a blockchain, but this is just an example, and a server on network may be utilized in place of the blockchain.

Also, in the above one embodiment example, a smart key for unlocking and/or locking a vehicle was described as an example, but the present invention is not limited to this example, and may be applied to any system required to authenticate a first apparatus when sending a request from the first apparatus to a second apparatus.

For instance, the present invention may be applied to a smart key used for a home door, a hotel room key, a home delivery locker, or a smart device for launching a particular device such as a computer, wherein any type of the request may be used.

Moreover, in the above one embodiment, the secret key and the public key were generated when the smart key app was installed, but the present invention is not so limited. For example, they may be generated when the smart key code initialization button 60, shown in FIG. 8, is pressed.

DESCRIPTION OF THE REFERENCE NUMBERS

ID. User
1. Smart key system
2. User terminal
3. Internet
4. Smart contract
5. Vehicle onboard apparatus
6. Smart key management server
7. User terminal-specific identification code
10. CPU

11. RAM
12. Input/output section
13. Bus
14. Data storage section
15. Program storage section
16. Request input device
17. Network communication device
18. Onboard apparatus wireless communication device
19. Smart key app
20. User secret key/public key
21. User ID
22. User type
23. User key attribute
24. Unlocking cryptographic information
26. Request command information
27. Smart contract address
29. User authentication section
30. Public key address generation section
31. Specific identification code generation section
32. Specific identification code transmitting section
33. Request receiving section
34. Request-with-a-signature generation section
35. Request-with-a-signature/public key transmitting section
40. Antenna
41. Control section
42. Transmitting/receiving section
43. Operating section
44. Display section
Audio output section
47. User terminal-specific identification code receiving section
48. Request-with-a-signature/public key receiving section
49. Public key address generation section
50. User terminal authentication section
51. Request processing section
53. Onboard apparatus management section
54. Smart contract issuing section
55. Smart contract address storage section
56. User ID receiving section
58. User interface
62. Public key address
63. Unlocking cryptographic information
65. Main screen button
66. Unlock button
67. Lock button
68. Start engine button
69. Open trunk button

The invention claimed is:

1. A request processing system having a first apparatus and a second apparatus associated with the first apparatus for receiving a request sent from the first apparatus at the second apparatus and executing the request,
  wherein the first apparatus comprises:
    a data storage unit operable to maintain a specific secret key and a public key;
    a processing unit configured with logic to generate first apparatus-identifying specific data, including public key data enabled to uniquely identify the public key and unlock cryptographic data enabled to uniquely identify unlocking cryptographic information;
    a processing unit configured with logic to write the generated first apparatus-identifying specific data into a predetermined address on a communication network; and a communication unit configured with logic to sending a request with a signature, signed with the secret key, and the public key to the second apparatus, wherein the second apparatus comprises:

a processing unit configured with logic to reading the first apparatus-identifying specific data written at the predetermined address;

a processing unit configured with logic to authenticate the first apparatus by generating, from the public key received from the first apparatus, public key data enabled to uniquely identify the public key; and determinie whether this public key is included in the downloaded first apparatus-identifying specific data as well as, based on the determination, validate a signature of the request with a signature based on the public key received from the first apparatus and the unlocking cryptographic data included in the downloaded first apparatus-identifying specific data; and a processing unit configured with logic to execute the validated request based on the authentication of the first apparatus.

2. The request processing system of claim 1, wherein the first apparatus is a smart key, and the second apparatus is mounted on a vehicle and is a vehicle onboard apparatus for controlling unlocking and locking of the vehicle by the request of the first apparatus.

3. The request processing system of claim 1, wherein the public key data is generated by using a hash function to convert the public key, and its size is smaller than the original public key.

4. The request processing system of claim 1, wherein the public key data is a public key address used in a blockchain system.

5. The request processing system of claim 1, wherein the first apparatus-identifying specific data is written in a smart contract address of Ethereum.

6. The request processing system of claim 1, further comprising a processing unit configured with logic to authenticate a writing authority of the first apparatus.

7. The request processing system of claim 1, wherein the first apparatus-identifying specific data is stored in a system for collecting a charged fee from a user according to a data size to be stored.

8. The request processing system of claim 1, wherein the unlocking cryptographic data enabled to uniquely identify the unlocking cryptographic information includes a unique identifier of a signature scheme and a unique identifier of a parameter of a signature scheme.

9. A request processing method performed at a request processing system, having a first apparatus and a second apparatus associated with the first apparatus for receiving a request sent from the first apparatus at the second apparatus and executing the request, the method comprising:

the steps of, executed by a computer being the first apparatus:

maintaining a specific secret key and a public key;

generating first apparatus-identifying specific data, including public key data enable to uniquely identify the public key and unlocking cryptographic data enable to uniquely identify unlocking cryptographic information;

writing the generated first apparatus-identifying specific data into a predetermined address on a communication network; and sending a request with a signature, signed with the secret key, and the public key to the second apparatus, and the steps of, executed by a computer being the second apparatus:

reading the first apparatus-identifying specific data written at the predetermined address;

authenticating the first apparatus by generating, from the public key received from the first apparatus, public key data enable to uniquely identify the public key; and determining whether this public key is included in the downloaded first apparatus-identifying specific data as well as, based on the determination, validating a signature of the request with a signature based on the public key received from the first apparatus and the unlocking cryptographic data included in the downloaded first apparatus-identifying specific data; and executing the validated request based on the authentication of the first apparatus.

10. The request processing method of claim 9, wherein the first apparatus is a smart key, and the second apparatus is mounted on a vehicle and is a vehicle onboard apparatus for controlling unlocking and locking of the vehicle by the request of the first apparatus.

11. The request processing method of claim 9, wherein the public key data is generated by using a hash function to convert the public key, and its size is smaller than the original public key.

12. The request processing method of claim 9, wherein the public key data is a public key address used in a blockchain system.

13. The request processing method of claim 9, wherein the first apparatus-identifying specific data is written in a smart contract address of Ethereum.

14. The request processing method of claim 9, further comprising the step of authenticating a writing authority of the first apparatus.

15. The request processing method of claim 9, wherein the first apparatus-identifying specific data is stored in a system for collecting a charged fee from a user according to a data size to be stored.

16. The request processing method of claim 9, wherein the unlocking cryptographic data enable to uniquely identify the unlocking cryptographic information includes a unique identifier of a signature scheme and a unique identifier of a parameter of a signature scheme.

* * * * *